US007950000B2

(12) United States Patent
Kipman et al.

(10) Patent No.: US 7,950,000 B2
(45) Date of Patent: May 24, 2011

(54) ARCHITECTURE THAT RESTRICTS PERMISSIONS GRANTED TO A BUILD PROCESS

(75) Inventors: Alex A. Kipman, Duvall, WA (US); Rajeev Goel, Sammamish, WA (US); Jomo A. Fisher, Redmond, WA (US); Christopher A. Flaat, Bellevue, WA (US); Chad W. Royal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 10/802,239

(22) Filed: Mar. 17, 2004

(65) Prior Publication Data

US 2005/0210448 A1    Sep. 22, 2005

(51) Int. Cl.
G06F 9/44 (2006.01)
G06F 9/45 (2006.01)
(52) U.S. Cl. ......... 717/121; 717/101; 717/122; 717/140
(58) Field of Classification Search .................. None
See application file for complete search history.

(56) References Cited

U.S. PATENT DOCUMENTS

| | | | |
|---|---|---|---|
| 6,178,546 B1 * | 1/2001 | McIntyre | 717/115 |
| 6,321,334 B1 | 11/2001 | Jerger et al. | |
| 6,574,736 B1 | 6/2003 | Andrews | |
| 6,606,711 B2 | 8/2003 | Andrews et al. | |
| 6,658,573 B1 | 12/2003 | Bischof et al. | |
| 6,662,357 B1 * | 12/2003 | Bowman-Amuah | 717/120 |
| 6,708,276 B1 * | 3/2004 | Yarsa et al. | 726/6 |
| 6,854,016 B1 * | 2/2005 | Kraenzel et al. | 709/229 |
| 6,910,128 B1 * | 6/2005 | Skibbie et al. | 713/170 |
| 7,058,978 B2 * | 6/2006 | Feuerstein et al. | 726/26 |
| 7,131,000 B2 * | 10/2006 | Bradee | 713/164 |
| 7,213,266 B1 * | 5/2007 | Maher et al. | 726/26 |
| 7,272,822 B1 * | 9/2007 | Riggins et al. | 717/124 |
| 7,350,191 B1 * | 3/2008 | Kompella et al. | 717/108 |
| 7,350,204 B2 * | 3/2008 | Lambert et al. | 717/172 |
| 7,487,493 B1 * | 2/2009 | Faulkner | 717/105 |
| 7,506,315 B1 * | 3/2009 | Kabadiyski et al. | 717/128 |
| 2002/0019941 A1 * | 2/2002 | Chan et al. | 713/185 |
| 2002/0065695 A1 * | 5/2002 | Francoeur et al. | 705/7 |
| 2002/0083341 A1 * | 6/2002 | Feuerstein et al. | 713/201 |
| 2002/0099952 A1 * | 7/2002 | Lambert et al. | 713/200 |
| 2002/0112232 A1 * | 8/2002 | Ream et al. | 717/176 |
| 2003/0163799 A1 * | 8/2003 | Vasilik et al. | 717/100 |
| 2003/0200532 A1 * | 10/2003 | Gensel | 717/120 |
| 2003/0208743 A1 * | 11/2003 | Chong et al. | 717/106 |
| 2003/0210139 A1 * | 11/2003 | Brooks et al. | 340/531 |

(Continued)

OTHER PUBLICATIONS

Michael Cymerman, Automate your build process using Java and Ant, JavaWorld, Oct. 20, 2000, pp. 1-10.*
Bailliez et al., Using Ant—Apache Ant User Manual, Version 1.5.1, release 2002, pp. 1-8, [retrieve online] http://web.archive.org/web/20030405012827/ant.apache.org/manual/using.html.*
Microsoft Computer Dictionary Fifth edition, published by Microsoft, 2002, p. 423.*
Apache Ant. The Apache Software Foundation, http://ant.apache.org, Feb. 29, 2004. 2 pages.

(Continued)

*Primary Examiner* — Tuan Q Dam
*Assistant Examiner* — Zheng Wei
(74) *Attorney, Agent, or Firm* — Workman Nydegger

(57) ABSTRACT

Architecture that facilitates management of a build process according to a level of trust of a build entity. The build process processes one or more build entities, each of which is associated with a level of trust. These associations are stored in a policy file that is run against the one or more entities at the start of the build process. The build process runs at a permission level that is representative of the lowest level of trust of the build entities. The levels of trust include at least trusted, semi-trusted, and untrusted levels. If the lowest level is untrusted, the build process fails, and the user is notified.

32 Claims, 7 Drawing Sheets

U.S. PATENT DOCUMENTS

| | | | |
|---|---|---|---|
| 2004/0123268 A1* | 6/2004 | Lundberg et al. | 717/103 |
| 2004/0225893 A1* | 11/2004 | Ng | 713/200 |
| 2005/0015762 A1* | 1/2005 | Steckler et al. | 717/176 |
| 2005/0039158 A1* | 2/2005 | Koved et al. | 717/100 |
| 2005/0114834 A1* | 5/2005 | Richards et al. | 717/114 |
| 2005/0177828 A1* | 8/2005 | Graham et al. | 717/175 |
| 2005/0198628 A1* | 9/2005 | Graham et al. | 717/174 |

OTHER PUBLICATIONS

NAnt: a .NET Build Tool. http://nant.sourceforge.net, Mar. 25, 2004. 2 pages.

L. Cheng, C.R.B. De Souza, S. Hupfer, J. Patterson, and S. Ross. Building Collaboration into IDEs. Queue, vol. 1 Issue 9, pp. 40-50, 2003.

* cited by examiner

ARCHITECTURE THAT RESTRICTS PERMISSIONS GRANTED TO A BUILD PROCESS

TECHNICAL FIELD

This invention is related to software development environments, and more specifically, to a software build environment.

BACKGROUND OF THE INVENTION

Software development environments are becoming more sophisticated by allowing the development of similar applications and/or application documents under a common development framework. This facilitates more user-friendly utilization such that developers can more readily and easily develop software, and hence, share the applications and/or documents with others. Since a common development framework is now available to many more users, the development of projects and other related entities can now be made widely available for public use.

Developers trade project entities through websites, e-mail and version control systems. As developers start sharing these entities, whether locally or over the Internet via community websites, for example, it is easy for the recipient user to grab a publicly available project (or entity) and load it into the development environment for immediate perusal and/or use. One of the first things the recipient developer will want to do is to build the entity in a build process to determine what it actually does. However, the process of building could invoke code embedded for malicious purposes. For example, while the build process is occurring, malicious code could be surreptitiously looking for user account numbers and passwords that can then be covertly transmitted to another location without the developer knowing about it.

What is needed is a trust mechanism that instills a level of trust in entities that are shared between developers and users.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that facilitates management of a build process according to a level of trust of a build entity. The build process processes one or more build entities, each of which is associated with a level of trust. These associations are stored in a policy file that is run against the one or more entities at the start of the build process. The build process runs at a permission level that is representative of the lowest level of trust of the build entities. The levels of trust include at least trusted, semi-trusted, and untrusted levels. If the lowest level is untrusted, the build process fails, and the user is notified.

The present invention provides a mechanism called "sandboxing" of a build platform that allows a developer to safely download, use, and augment their build processes. In one implementation, sandboxing allows the developer to mark different build entities as fully trusted, semi-trusted or untrusted. Without sandboxing, developers would be forced to fully trust all build processes, both the processes generated by the developer as well as processes generated by the community or third parties.

At least three major entities that can interact with the build process include operating system users/groups, project files, and assemblies bound to the build process such as tasks and loggers. All of these entities can provide the potential for compromising a machine through the build platform. At build time, the permission under which the build platform executes is determined by the intersection of the levels of trust allowed by each entity.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
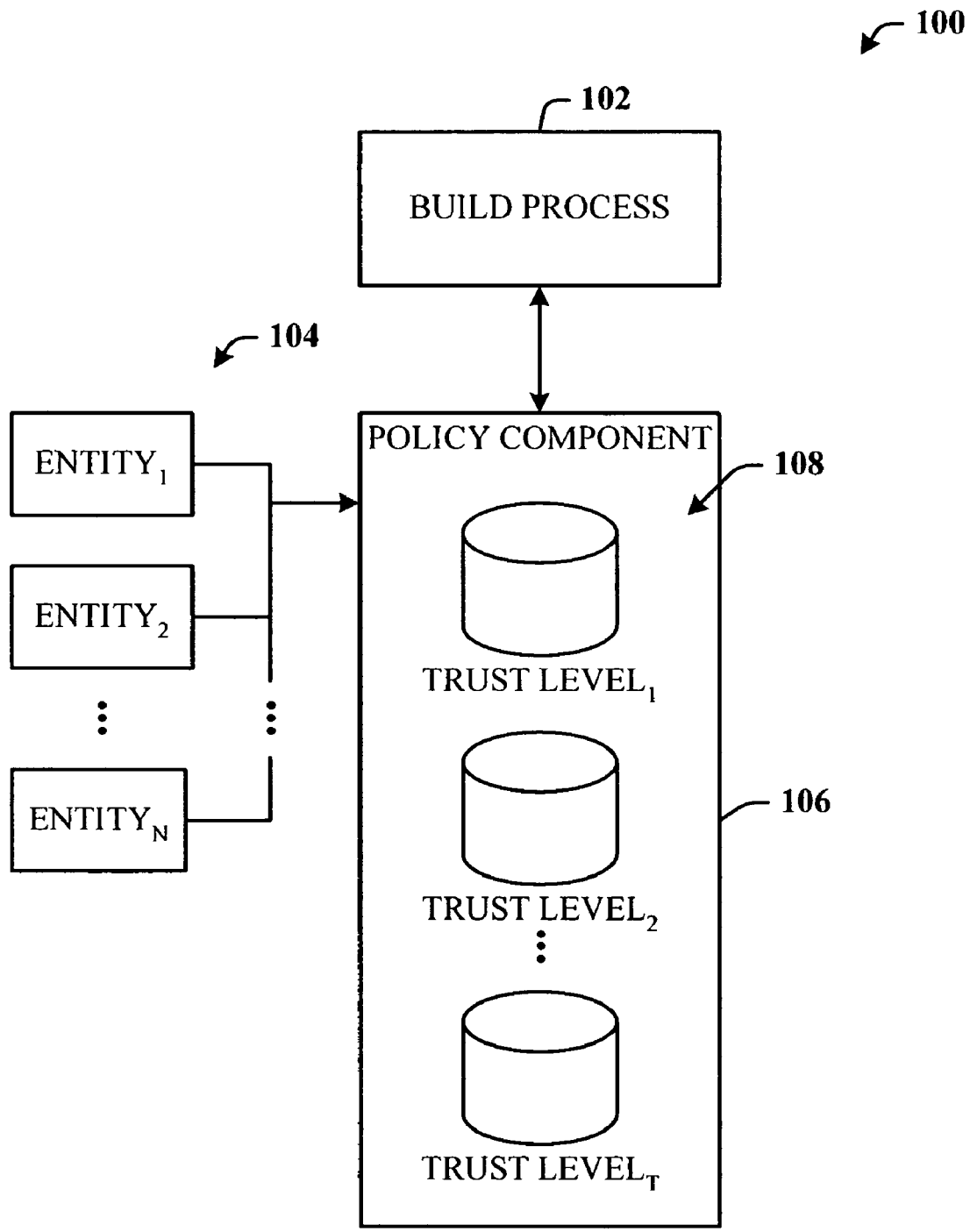
FIG. 1 illustrates a block diagram of a build system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block diagram of a build system 100 of the present invention. The system 100 executes a build process 102 that utilizes one or more entities 104. The entities 104 comprise one or more entities denoted $ENTITY_1$, $ENTITY_2$, . . . , $ENTITY_N$, of which any single entity or combination thereof can be used during the build process 102. Any of the entities 104 have the potential for compromising a machine through the build software platform.

To counter such a threat, the system 100 of the present invention applies a mechanism, known hereinafter as "sandboxing". Sandboxing of a build platform is a unique mechanism that allows developers to safely download, use, and augment build processes. Without sandboxing, developers would be forced to fully trust all build processes, both the processes generated by the developer, as well as processes generated by the community or third parties. Sandboxing allows developers to associate the different entities 104 according to different levels of trust, e.g., fully trusted, semi-trusted, and untrusted. This mechanism allows the build process to operate safely, since the policy can be applied to the build, based on the intersection of trust between the entities involved during the build process.

The system 100 includes this mechanism in the form of a build policy 106 that can be applied to each of these entities in order to manage their permissions during the build process. The build policy 106 is a file through which the developer is allowed to define and associate a level of trust 108 (denoted as one of a plurality of the trusts $TRUST\ LEVEL_1$, $TRUST\ LEVEL_2$, . . . , $TRUST\ LEVEL_T$) for each of the entities 104. At build time, the principal permission level under which the build platform executes is determined by the intersection of the individual permissions (or levels of trust) associated with each of the entities 104. That is, the lowest level of trust of all the involved entities dictates the principal permission level for execution of the build process.

Figure 2:
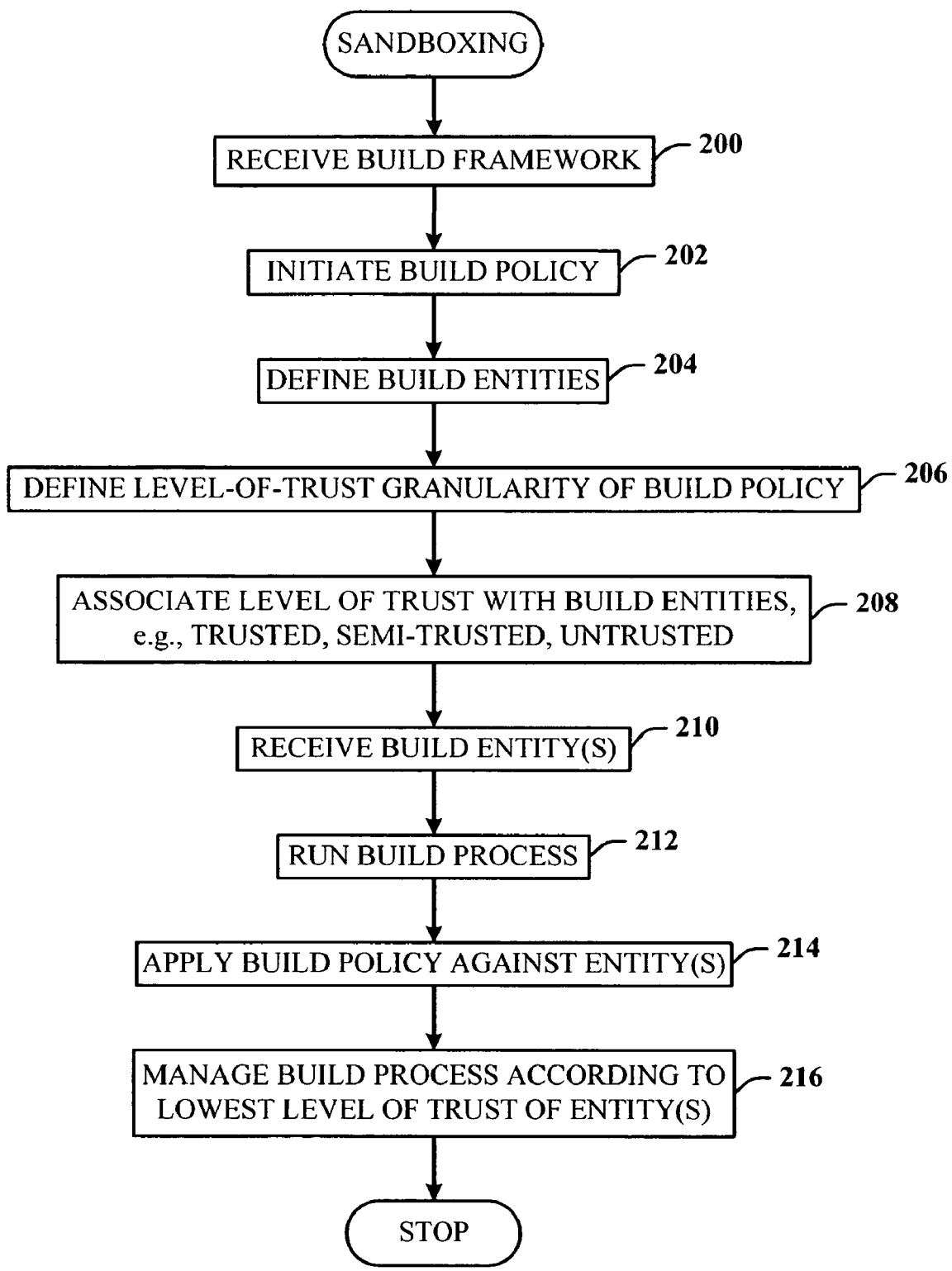
FIG. 2 illustrates a flow chart of a sandbox process of the present invention.

Referring now to FIG. 2, there is illustrated a flow chart of a sandbox process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the developer/user has available the build framework. At 202, the developer initiates the build policy by creating a policy file. This file can be additional to a default file provided in the software distribution, both of which are processed to determine the ultimate levels of trust to be applied. At 204, the developer determines what entities will be involved with a build process. Within the policy file, the developer defines the granularity for the levels of trust, as indicated at 206. For example, in one implementation, there are three levels: trusted, semi-trusted, and untrusted. The architecture of the present invention is sufficiently flexible to let the developer define the number of levels. However, it is to be appreciated that the build framework may be distributed to developers with a default granularity that can later be redefined by the developer. At 208, given the type and number of entities and the levels of trust, associations can now be made therebetween. At 210, the developer downloads or receives an entity. At 212, the build process is run to determine what the entity does. At 214, the build policy is processed at the start of the build process. At 216, the build process is managed according to the lowest level of trust of all entities required to run during the build. The process then reaches a Stop block.

Figure 3:
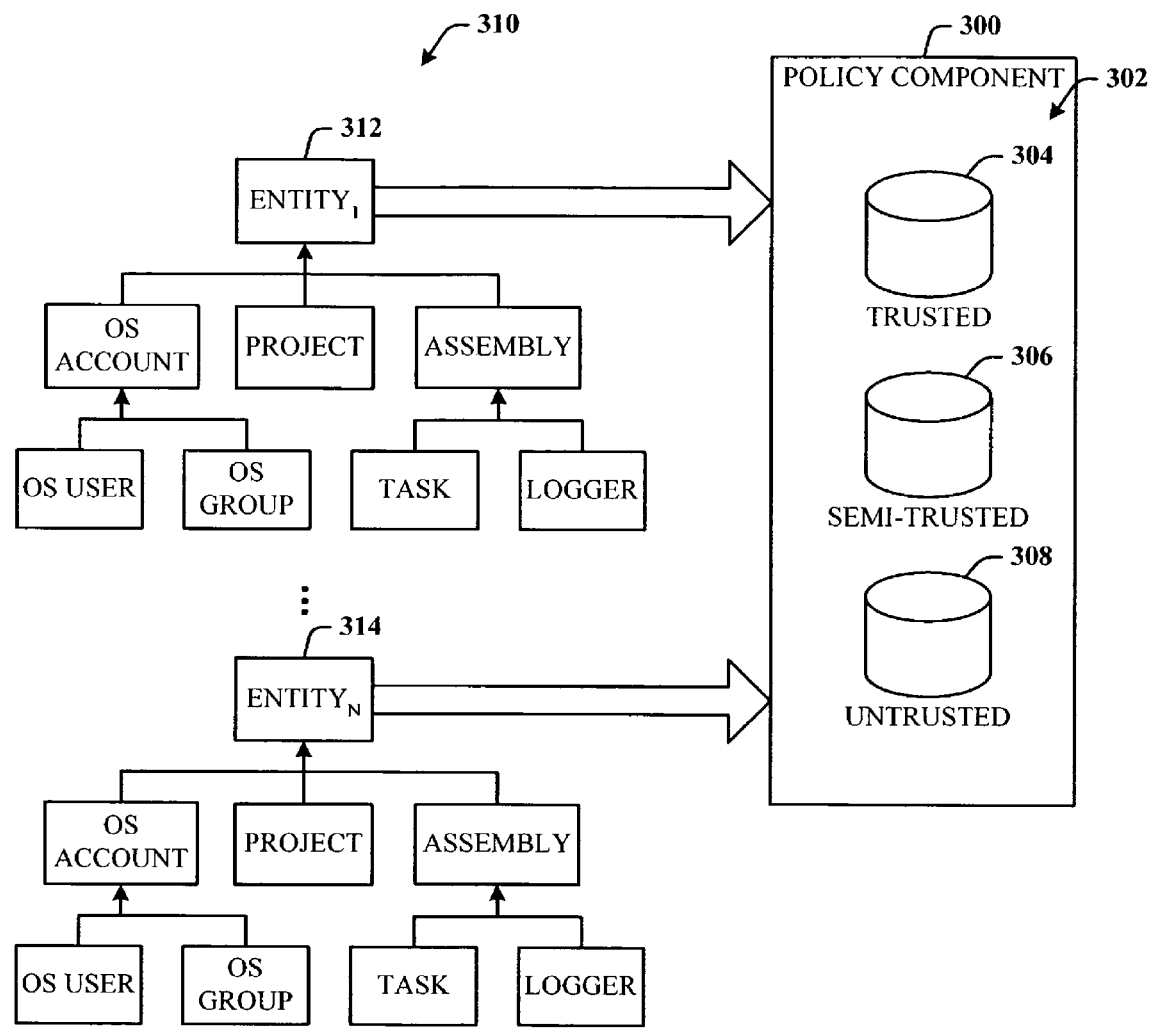
FIG. 3 illustrates one implementation of a build policy that employs three levels of trust in accordance with the present invention.

Referring now to FIG. 3, there is illustrated one implementation of a build policy 300 that employs three levels of trust 302 in accordance with the present invention. The three levels of trust 302 include trusted 304, semi-trusted 306, and untrusted 308. Sandboxing allows the developer to fully control what entities 310 (denoted $ENTITY_1$ . . . $ENTITY_N$) to trust, semi-trust, and distrust, and ensures that the build mechanism is the only build platform that allows customers to easily apply trust policies over a given set of entities to yield a safer build environment.

For the purposes of this description, "entity" is defined as anything that can interact with the build process maliciously or otherwise. Some examples of entities include project files, operating system (OS) account information, and assemblies that are bound to a build process, e.g., tasks and loggers. In this embodiment, a first entity 312 can include any one of the following: OS account information such as OS user information and OS group information; a project; and assembly information, that includes a task and/or a logger. OS account information includes user rights the current user has for a machine, within a workgroup, and/or domain. Thus, the first entity 312 can be for example, a project, while a second entity (not shown) can be a task, and an Nth entity 314 can be OS user information.

The build component file segments the entities into different trust categories. Following is a sample default file.

```
<Policy>
    <ProjectGroup PermissionSetName="FullyTrusted">
        <LocationMembershipCondition Pattern="**"/>
    </ProjectGroup>
    <ProjectGroup PermissionSetName="Semi-Trusted">
        <LocationMembershipCondition Pattern="\\**"/>
        <LocationMembershipCondition
Pattern="$(MyCommunityProjects)\**"/>
    </ProjectGroup>
    <ProjectGroup PermissionSetName="Untrusted">
        <LocationMembershipCondition Pattern="$(Temp)\**"/>
        <LocationMembershipCondition
Pattern="$(TemporaryInternetFiles)\**"/>
            <LocationMembershipCondition Pattern=
            "$(BuildBinPath)\**"/>
            <LocationMembershipCondition Pattern=
            "$(SystemRoot)\**"/>
    </ProjectGroup>
</Policy>
```

In this implementation, the following predefined constants are available:
$(MycommunityProjects)—The location of this user's community projects directory.
$(Temp)—The user's temporary file directory.
$(TemporaryInternetFiles)—The user's temporary internet files directory.
$(BuildBinPath)—The directory from which the build executable is running.

The build process reads the build policy files once at startup. This indicates that there can be more than one policy file, all of which will be applied at startup of the build process. If a project does not map to any ProjectGroup, then it is untrusted, and consequently will not build. If there are no build policy files at all, or if there are no ProjectGroups in those files, then the build process fails with a descriptive error message advising the user to reinstall. If any file matching pattern is illegal—for example '***'—then the build process fails with a descriptive error message.

A sample build policy file written in XML (extensible Markup Language) is the following:

```
<Policy>
    <ProjectGroup PermissionSetName="FullyTrusted">
        <ProjectMembershipCondition Pattern="**"/>
        <UserMembershipCondition Pattern="Administrator"/>
        <AssemblyMembershipCondition Pattern="BuildTasks.dll"/>
        <AssemblyMembershipCondition Pattern="BuildLoggers.dll"/>
    </ProjectGroup>
    <ProjectGroup PermissionSetName="Semi-Trusted">
        <LocationMembershipCondition Pattern="\\**"/>
        <UserMembershipCondition Pattern="AKipman"/>
        <AssemblyMembershipCondition Pattern="GDNTasks.dll"/>
        <AssemblyMembershipCondition Pattern="GDNLoggers.dll"/>
    </ProjectGroup>
    <ProjectGroup PermissionSetName="Untrusted">
        <LocationMembershipCondition Pattern="$(Temp)\**"/>
        <UserMembershipCondition Pattern="Guest"/>
    </ProjectGroup>
</Policy>
```

Each ProjectGroup element is a different level of trust. An entity can be a member of more than one project group. In this case, it receives the least level of trust of all of the project groups of which it is a member, which is the same as the intersection of all permissions granted.

In this particular implementation, the definition of trusted, partially-trusted (also called semi-trusted), and untrusted, are the following:

When all entities are deemed fully trusted, the build process will have no restrictions. Standard OS restrictions will continue to apply (e.g., ACL—Access Control Lists).

If any of the entities are deemed partially trusted, the build process will execute with the least set of privileges needed to be useful. These privileges are loosely defined in the following table.

| Permission | Resource |
| --- | --- |
| Full File I/O Access | Project Directory cone recursively. |
| Read and Path Discovery Access | Directory that has build executable in it, but not subdirectories. |
| Read and Path Discovery Access | Build framework install directory, but not subdirectories. |
| Strong Name Identity Permission | OS Key |

The build process would receive no other permissions. This includes, but is not limited to registry, temporary directory, intranet files, unmanaged code access, UI (User Interface), DNS (Domain Naming System), and TCP/IP access.

If any of the entities are deemed untrusted, the build process will abort with a security message, before the process even begins.

A user can easily create projects that do anything they like. For example, a user should be able to open a text editor program and create a project that formats his or her hard drive. Additionally, when they build the project, there should be no security hassle.

When a user downloads a community project, all of the defaults should direct him towards building that project as semi-trusted in a restricted sandbox. The easy path for the user should also be the safe path. In one implementation, community projects can default download into a specific directory.

In another example, project files of an intranet share can build in a restricted sandbox.

Temporary project links will not build. Even if there is an association configured for certain project file extensions to invoke the build process, the build policy can be made such that the project not build under any of the following circumstances: the project is an attachment to an e-mail and the user double-clicks it directly; the project is compressed in a compressible file format and the user clicks directly in the compressed file folder; and, the project is a link on a web page and the user clicks it. These are not useful scenarios, since there would be no way for supporting files—such as source code— to be present when the project builds.

Each of the circumstances listed above results in a copy of the project being placed in a well-known temporary file location. It is to be appreciated that any projects in well-known temporary file locations can be set to be untrusted, and therefore, will not build.

By default, projects in the system directory (i.e., % SystemRoot %) recursive can be set to not build. Such projects should always be imported, rather than allowed to be built directly.

Additionally, by default, projects in the directory tree rooted at the location of the build application executable should not build, since it is possible that executable has been placed in a non-system location. For example, it may have been copied into an enlistment.

Figure 4:
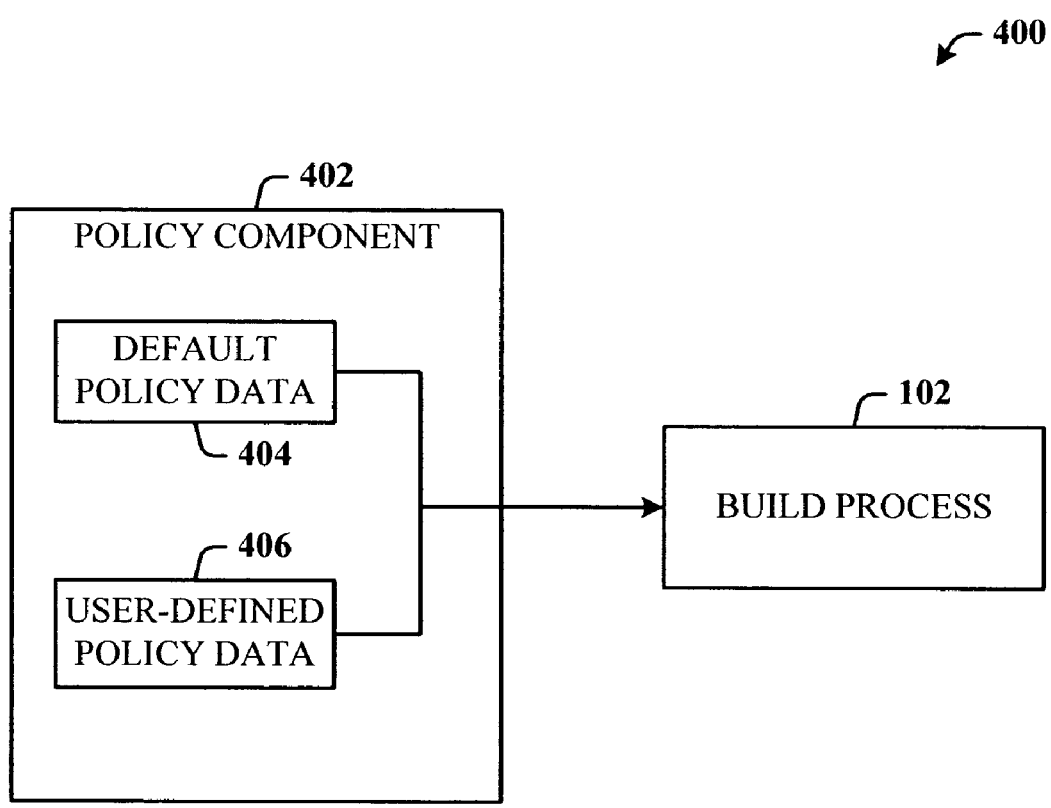
FIG. 4 illustrates a diagram of a policy system that implements user-defined policy information in accordance with the present invention.

Referring now to FIG. 4, there is illustrated a diagram of a policy system 400 that implements user-defined policy information in accordance with the present invention. The system 400 comprises a policy component 402 that includes default policy data 404 and user-defined policy data. Such a situation can arise where the user chooses to supplement the default policy 404 provided with the software distribution. Either or both of the policy data (404 and 406) can be provided in the form of a file (e.g., XML file, as indicated hereinabove in FIG. 3). In any case, it is within contemplation of the present invention that policy data provided in any form can be processed to arrive at the overall level of trust that will be applied against the build process 102. When the build process is run, both of the policy data (404 and 406) are processed to arrive at the level of trust for the build process, and where conflict occur, the user-defined policy wins.

Figure 5:
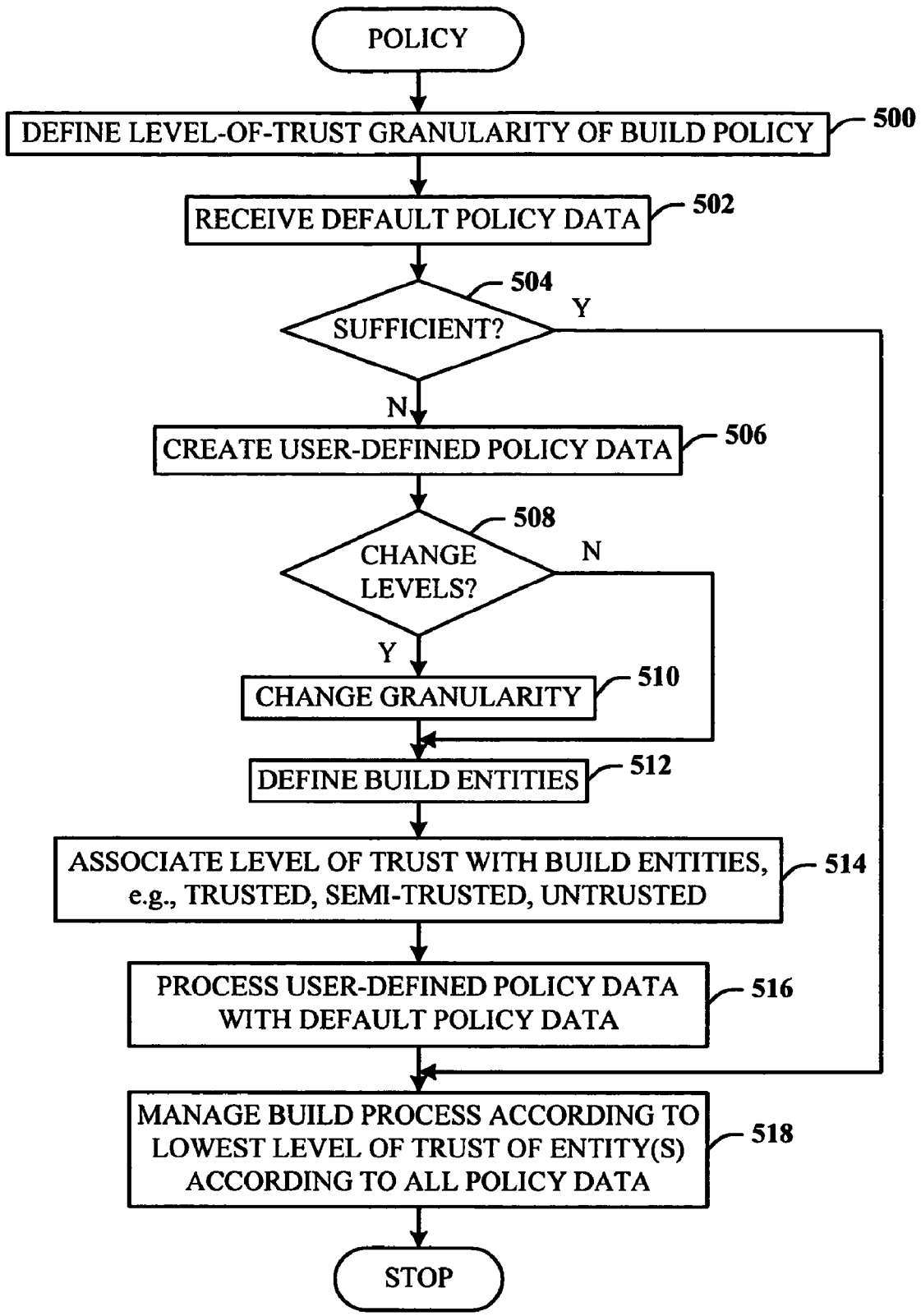
FIG. 5 illustrates a flow chart of a process for implementing user-defined policy data.

Referring now to FIG. 5, there is illustrated a flow chart of a process for implementing user-defined policy data. At 500, the user defines the granularity desired for build policy. At 502, the user receives the default policy data. At 504, the user determines if the default policy is sufficient for the given purposes. If No, flow is to 506 where the user creates the user-defined policy data. At 508, the user determines whether to change the number levels of trust by adding to the defaults levels. If Yes, at 510, the user adds one or more levels of trust to the user-defined data.

It is to be appreciated that a trust level needs to have semantic meaning to the platform. The platform understands what is trusted, semi-trusted, and untrusted, for example. The platform can properly grant permissions to the build entity based on the trust level. If a user creates a "new" trust level in the user-defined file, the new trust level needs to provide the semantic meaning to the platform of what it should grant based on the trust level. More specifically, this can be resources on a computer. In this context, the build platform grants the build entity access to all resources on the computer, under full-trust. Under semi-trust, the build platform will grant the build entity access to a lesser number of resources, and so on. The disclosed architectures is not limited to just three levels of trust, but can employ additional user-defined levels as long as the semantic meaning is provided such that the platform can interact accordingly.

Continuing with FIG. 5, at 512, the build entities are defined. At 514, the build entities are associated with the levels of trust, keeping in mind that the default policy provides predefined associations that can be supplemented or even overridden where the user defines over the default associations in the user-defined policy file. For example, if the default policy has all files and folders of the build platform C: drive associated with requiring a full-trust level, the user can override such a statement by including the same association in the user-defined policy file at a lower trust level. Of course, this can become a security issue such that all the user need do is downgrade the default setting of the default policy file, in the user-defined file. In view thereof, this can be mitigated by only applying the user-defined policy data when that data is placed in the same location as the default policy data, a location that has restricted access. This forces the user to log in with full access rights (e.g., as an Administrator), in which case, all default settings can be changed or overridden.

At 516, the user-defined data is processed with the default policy data. At 518, the build process is managed according to the intersection of all policy data. The process then reaches a Stop block.

If the default policy data is sufficient for the user, flow is from 504 to 518 to manage the build process according to the default policy. Additionally, at 508, if the user chooses not to add to the levels of trust, flow is to 512 to then define the build entities according to the user-defined policy data, and proceed accordingly.

Figure 6:
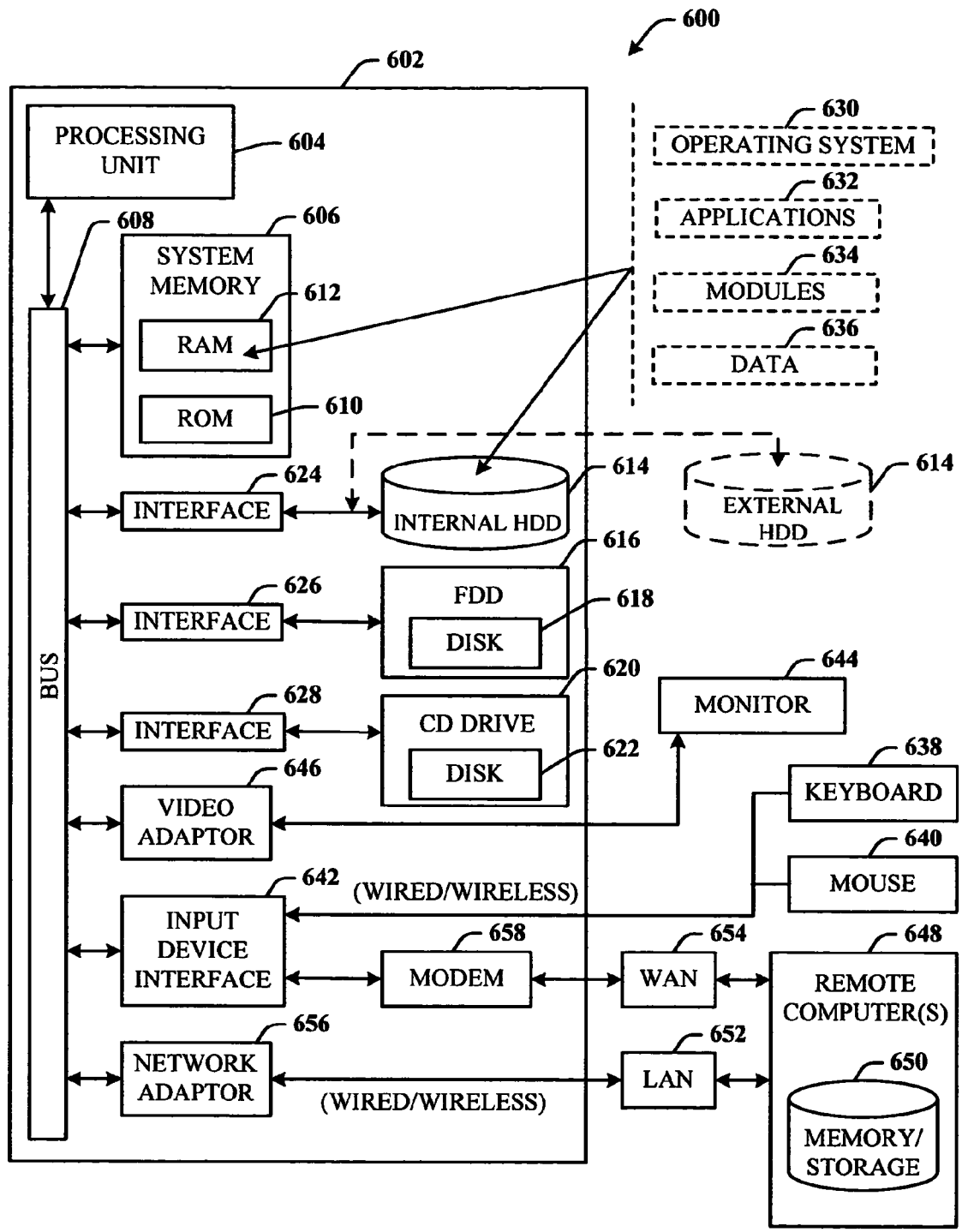
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the present invention, FIG. 6 and the following discussion are intended to provide a brief, general description of a suitable computing environment 600 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, there is illustrated an exemplary environment 600 for implementing various aspects of the invention that includes a computer 602, the computer 602 including a processing unit 604, a system memory 606 and a system bus 608. The system bus 608 couples system components including, but not limited to, the system memory 606 to the processing unit 604. The processing unit 604 may be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 612, including an operating system 630, one or more application programs 632, other program modules 634 and program data 636. All or portions of the operating system, applications, modules, and/or data can also be cached in the RAM 612.

It is appreciated that the present invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but may be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers etc.

The computer 602 may operate in a networked environment using logical connections via wired and/or wireless communications to one or more remote computers, such as a remote computer(s) 648. The remote computer(s) 648 may be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656. When used in a WAN networking environment, the computer 602 can include a modem 658, or is connected to a communications server on the LAN, or has other means for establishing communications over the WAN 654, such as by way of the Internet. The modem 658, which may be internal or external and a wired or wireless device, is connected to the system bus 608 via the serial port interface 642. In a networked environment, program modules depicted relative to the computer 602, or portions thereof, may be stored in the remote memory/storage device 650. It will be appreciated that the network connections shown are exemplary and other means of establishing a communications link between the computers may be used.

The computer 602 is operable to communicate with any wireless devices operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 7:
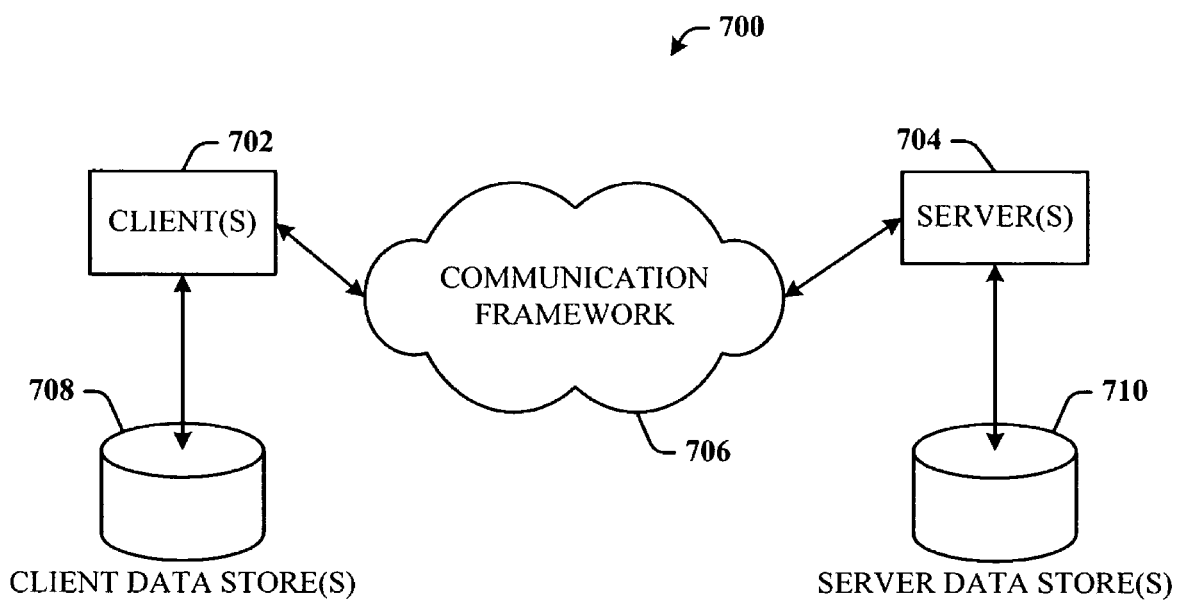
FIG. 7 illustrates a schematic block diagram of an exemplary computing environment in accordance with the present invention.

Referring now to FIG. 7, there is illustrated a schematic block diagram of an exemplary computing environment 700 in accordance with the present invention. The system 700 includes one or more client(s) 702. The client(s) 702 can be hardware and/or software (e.g., threads, processes, computing devices). The client(s) 702 can house cookie(s) and/or associated contextual information by employing the present invention, for example. The system 700 also includes one or more server(s) 704. The server(s) 704 can also be hardware and/or software (e.g., threads, processes, computing devices). The servers 704 can house threads to perform transformations by employing the present invention, for example. One possible communication between a client 702 and a server 704 may be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications may be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704. Thus, the server(s) 704 can be websites one or more of which have an entity(s) posted for download and use by a developer/user one of the client(s) 702.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates management of a build process, comprising:
  a build process processor that executes to build a project that includes a plurality of build entities, wherein building the project includes compiling at least one of the plurality of build entities, the build entities including one or more project files, operating system account information, and one or more assemblies; and
  a policy component that is accessed by the build process processor before building the project to determine a level of trust within which the build process executes, wherein the policy component specifies a level of trust for each build entity involved in the build process;
  wherein the level of trust within which the build process executes is determined by analyzing the levels of trust associated with each of the plurality build entities, and selecting the lowest level of trust of all involved build entities,
  wherein the levels of trust include:
    (i) levels that are representative of trusted, which has no restrictions on the build process,
    (ii) semi-trusted, which has restrictions on the build process, the restrictions including preventing the build process from accessing a registry of operating system executed in the system and from having Transmission Control Protocol/Internet Protocol (TCP/IP) access of the system, and
    (iii) untrusted, which causes the build process to fail,
  wherein if the lowest level of trust is untrusted and the build process fails, the developer is notified.

2. The system of claim 1, wherein the policy component includes one or more policy files that define the levels of trust for the build entities.

3. The system of claim 2, wherein the policy files include a user defined policy file and a default policy file.

4. The system of claim 1, wherein the one or more assemblies include one or more of a task, or a logger.

5. The system of claim 1, wherein the associated level of trust of a build entity is determined by a location where the build entity is stored.

6. The system of claim 1, wherein if a build entity is not associated with a level of trust, the assigned level of trust for the build process is untrusted.

7. The system of claim 1, wherein at least one of the build entities is received at least by one of downloading from a website, as part of an e-mail, or from a version control system.

8. A system that facilitates management of a build process, comprising:
  a build process processor that executes to build a project that includes a plurality of build entities, wherein building the project includes compiling at least one of the plurality of build entities, the build entities including one or more project files, operating system account information, and one or more assemblies; and
  one or more policy files that are accessed by the build process processor before building the project to determine a permission level within which the build process executes, wherein the one or more policy files specify a level of trust for each of the plurality of build entities involved in the build process;
  wherein the permission level within which the build process executes is determined by analyzing the levels of trust associated with each of the plurality of build entities, and selecting the lowest level of trust of all involved build entities,
  wherein the levels of trust include:
    (i) levels that are representative of trusted, which has no restrictions on the build process,
    (ii) semi-trusted, which has restrictions on the build process, the restrictions including preventing the build process from accessing a registry of operating system executed in the system and from having Transmission Control Protocol/Internet Protocol (TCP/IP) access of the system, and
    (iii) untrusted, which causes the build process to fail,
  wherein if the lowest level of trust is untrusted and the build process fails, the developer is notified.

9. The system of claim 8, wherein the policy files assign a level of trust to a build entity by grouping storage locations that commonly store build entities and assigning a level of trust to the groupings such that if a build entity is stored in a location that is part of a certain group, the build entity is assigned the level of trust assigned to that certain group.

10. The system of claim 9, wherein if a build entity is stored in a location that is not included in any of the groupings in any of the policy files, the build entity is untrusted such that the build process executes under a permission level of untrusted.

11. The system of claim 8, wherein the one or more assemblies include one or more of a task, or a logger.

12. The system of claim 8, wherein the one or more policy files include a user defined policy file that defines a new permission level under which the build process may execute.

13. The system of claim 8, wherein the one or more policy files are written in XML.

14. The system of claim 8, wherein the one or more policy files are adjusted automatically according to one or more parameters.

15. A computer storage medium having computer-executable instructions for performing a method for managing a build process, the method comprising:
  receiving a command to build a project that includes a plurality of build entities, the build entities including one or more project files, operating system account accessing one or more policy files to determine a level of trust for each of the plurality of build entities, wherein the one or more policy files specify a level of mast for each of the plurality of build entities involved in the build process,
  wherein the levels of trust include:
    (i) a trusted level that places no restrictions on the build process,
    (ii) a semi-trusted level that places restrictions on the build process, but still allows the build process to execute, the restrictions including preventing the build process from accessing a registry of operating system executed in the system and from having Transmission Control Protocol/Internet Protocol (TCP/IP) access of the system, and
    (iii) an untrusted level that causes the build process to abort;
  determining the level of trust under which the build process executes by determining the lowest level of trust that is assigned to a build entity in the project; and
  executing the build process with the determined level of trust, if the level of trust is trusted or semi-trusted, or failing the build process if the level of trust is untrusted.

16. The computer storage medium of claim 15, further comprising sending a message when the build process fails.

17. The computer storage medium of claim 15, further comprising receiving input from a developer that defines criteria to be included in the one or more policy files to define how a level of trust is assigned to a build entity.

18. The computer storage medium of claim 17, wherein the criteria includes a location where a build entity is stored, or the user who is logged into the system.

19. The computer storage medium of claim 15, further comprising determining that the one or more policy files does not contain criteria that define a level of trust for one of the build entities in the project, and assigning an untrusted level of trust to the build entity.

20. The computer storage medium of claim 15, wherein one of the plurality of build entities is associated with at least two levels of trust.

21. The computer storage medium of claim 15, wherein the one or more policy files includes a default policy file and a user-defined policy file.

22. The computer storage medium of claim 21, wherein the user-defined policy file overrides the default file when a conflict occurs.

23. The computer storage medium of claim 15, wherein at least one of the one or more policy files is stored with access restrictions.

24. A method performed by a processor of a computer system for specifying a level of trust under which a build process is executed in an integrated development environment, the method comprising:
  receiving, by a processor that executes code for the integrated development environment, a command to build a project that includes a plurality of build entities, the build entities including one or more project files, operating system account information, and one or more assemblies;
  accessing one or more policy files to determine a level of trust for each of the plurality of build entities, wherein the one or more policy files specify a level of trust for each of the plurality of build entities involved in the build process, wherein the levels of trust include:
    (i) a trusted level that places no restrictions on the build process,
    (ii) a semi-trusted level that places restrictions on the build process, but still allows the build process to execute, the restrictions including preventing the build process from accessing a registry of operating system executed in the system and from having Transmission Control Protocol/Internet Protocol (TCP/IP) access of the system, and
    (iii) an untrusted level that causes the build process to abort;
  determining the level of trust under which the build process executes by determining the lowest level of trust that is assigned to a build entity in the project; and
  executing the build process with the determined level of trust, if the level of trust is trusted or semi-trusted, or failing the build process if the level of trust is untrusted.

25. The method of claim 24, further comprising sending a message when the build process fails.

26. The method of claim 24, further comprising receiving input from a developer that defines criteria to be included in the one or more policy files to define how a level of trust is assigned to a build entity.

27. The method of claim 26, wherein the criteria includes a location where a build entity is stored, or the user who is logged into the system.

28. The method of claim 24, further comprising determining that the one or more policy files does not contain criteria that define a level of trust for one of the build entities in the project, and assigning an untrusted level of trust to the build entity.

29. The method of claim 24, wherein one of the one or more build entities is associated with at least two levels of trust.

30. The method of claim 24, wherein the one or more policy files includes a default policy file and a user-defined policy file.

31. The method of claim 30, wherein the user-defined policy file overrides the default file when a conflict occurs.

32. The method of claim 24, wherein at least one of the one or more policy files is stored with access restrictions.

* * * * *